United States Patent
Lee et al.

(10) Patent No.: US 8,455,586 B2
(45) Date of Patent: Jun. 4, 2013

(54) GELATOR FOR PRODUCING A GEL ELECTROLYTE

(75) Inventors: Yuh-Lang Lee, Tainan (TW); Ching-Lun Chen, Tainan (TW)

(73) Assignee: National Cheng Kung University, Tainan (TW)

( * ) Notice: Subject to any disclaimer, the term of this patent is extended or adjusted under 35 U.S.C. 154(b) by 311 days.

(21) Appl. No.: 12/722,588

(22) Filed: Mar. 12, 2010

(65) Prior Publication Data
US 2010/0267849 A1   Oct. 21, 2010

(30) Foreign Application Priority Data
Apr. 17, 2009   (TW) .............................. 98112806 A

(51) Int. Cl.
*C08F 6/00*     (2006.01)
*C08L 9/02*     (2006.01)
*C08L 55/00*    (2006.01)

(52) U.S. Cl.
USPC .......... 524/566; 252/62.2; 429/188; 429/300; 429/304; 429/305

(58) Field of Classification Search
USPC .................. 524/566; 252/62.2; 429/188, 300, 429/304, 305
See application file for complete search history.

(56) References Cited

U.S. PATENT DOCUMENTS
6,150,455 A  *  11/2000  Takamiya et al. ............. 524/566
7,638,242 B2   12/2009  Choi et al.

FOREIGN PATENT DOCUMENTS
JP   2002145864   *   5/2002

OTHER PUBLICATIONS
J.Wu et al., Progress on the electrolytes for dye-sensitized solar cells, Pure Appl. Chem., vol. 80, No. 11, pp. 2241-2258, 2008.*

* cited by examiner

*Primary Examiner* — James J Seidleck
*Assistant Examiner* — Deve E Valdez
(74) *Attorney, Agent, or Firm* — Rabin & Berdo, P.C.

(57) ABSTRACT

A copolymeric gelator includes a minor monomeric unit; and a major acrylonitrile (AN) monomeric unit copolymerized with the minor monomeric unit to provide a copolymer that is soluble in a solvent comprised of 1,2-dimethyl-3-propylimidazolium iodide and 3-methoxypropionitrile. The major acrylonitrile (AN) monomeric units have good ionic conductivity and coordinating sites for lithium ions to be dissolved with a liquid-electrolytic solvent. The minor monomeric units may be selected among vinyl acetate, allyl acetate, styrene, acrylamide and a combination thereof. The gelator and a liquid-electrolytic solvent may be used to produce a gel electrolyte.

10 Claims, 3 Drawing Sheets

GELATOR FOR PRODUCING A GEL ELECTROLYTE

FIELD OF THE INVENTION

The present invention relates to a gelator, especially to a gelator for producing a gel electrolyte.

BACKGROUND OF THE INVENTION

Electrochemical cells convert chemical energy to electrical energy when a reduction-oxidation reaction occurs in the cells. Typically, an electrochemical cell comprises two electrodes and an electrolyte. The two electrodes are electrical conductors. The electrolyte is connected with the two electrodes and is an electrical conductor. The electrolyte is either a liquid electrolyte or a solid electrolyte.

Usually, liquid electrolytes are solutions in which ions are dissociated, and are commercially applied in conventional zinc-carbon batteries and the like. Liquid electrolytes have acceptable ionic conductivity (i.e. ionic conductivity greater than $10^{-3}$ S cm$^{-1}$ (Siemens per centimeter)) but tend to leak from the batteries. Additionally, most of the liquid electrolytes are selected from some strong bases (e.g. sodium hydroxide or potassium hydroxide) and evaporate easily. Both electrolyte leakage and evaporation reduce the electrolyte available, make encapsulation processes of batteries difficult and reduce effectiveness of batteries.

Solid electrolytes are available in newer, more advanced batteries and do not have leakage and evaporation problems. However, solid electrolytes only have ionic conductivity in the range of $10^{-5}$ S cm$^{-1}$. Better ionic conductivity is necessary to supply enough power by batteries.

An energy crisis is approaching, and scientists all over the world are devoted to the exploitation of plentiful natural resources, especially to the exploitation of energy from sunlight. A solar cell converting the energy from the sunlight to electrical energy is a well-known device. Two types of solar cells have been developed and comprise semiconductor solar cells and liquid solar cells.

Semiconductor solar cells are fully developed and efficiently convert light to electricity by more than 20%. However, production cost of semiconductor solar cells is high.

Liquid solar cells have the same problems as liquid electrolytes in the electrochemical cells.

Accordingly, a need for a new electrolyte that combines the advantages of all electrolytes to overcome these problems exists.

SUMMARY OF THE INVENTION

The first objective of the present invention is to provide a gelator for producing a gel electrolyte that has acceptable ionic conductivity and does not evaporate easily.

The second objective of the present invention is to provide a gelator for producing a gel electrolyte that can be used to make a dye-sensitized solar cell (DSSC), an electrochromic device (ECD) and an electrochemical cell.

The gelator for producing a gel electrolyte is a copolymer and comprises multiple major monomeric units, multiple minor monomeric units and multiple optional components. The major monomeric units comprise acrylonitrile (AN) monomeric units that have acceptable ionic conductivity and coordinating sites for lithium ions to be dissolved with a liquid-electrolytic solvent. The minor monomeric units are a combination of at least one type monomeric unit, and the combination of at least one type monomeric unit is selected from a group consisting of vinyl acetate (VA), allyl acetate (AA), styrene, acrylamide and at least one reactive compound. A gel electrolyte is a mixture of a gelator and a liquid-electrolytic solvent.

BRIEF DESCRIPTIONS OF THE DRAWINGS

DETAILED DESCRIPTION OF THE PRESENT INVENTION

A gelator for producing a gel electrolyte in accordance with the present invention is a copolymer and comprises multiple major monomeric units, multiple minor monomeric units and multiple optional components.

The major monomeric units comprise acrylonitrile (AN) monomeric units that have acceptable ionic conductivity and coordinating sites for lithium ions to be dissolved with a liquid-electrolytic solvent.

The minor monomeric units are a combination of at least one type monomeric unit, and the combination of at least one type monomeric unit is selected from a group consisting of vinyl acetate (VA), allyl acetate (AA), styrene, acrylamide and at least one reactive compound.

VA and AA contain an acid radical, styrene contains a basic radical and acrylamide contains a neutral radical.

The reactive compound has high reactivity with polar or non-polar solvents and is selected from a group consisting of ethylene glycol, propylene glycol, tetramethylene glycol, hexafluoropropylene, trichloroethylene, methylmethacrylate, vinylpyrrolidone, ethylene, ethylene oxide, propylene, cellulose acetate, cellulose acetate butyrate, cellulose acetate propionate, cyanoethylpullulan, cyanoethyl cellulose, cyanoethylsucrose and carboxymethyl cellulose.

The optional components are selected from a group consisting of itaconic acid, sodium allyl sulfonate, sodium methallyl sulfonate, sodium 4-(2-methylprop-2-enoylamino) benzenesulfonate and 2-isopropenylpyridine.

Itaconic acid contains a weakly acidic chromophore group, sodium allyl sulfonate, sodium methallyl sulfonate and sodium 4-(2-methylprop-2-enoylamino) benzenesulfonate contain a strongly acidic chromophore group, and 2-isopropenylpyridine contains a basic chromophore group.

As for producing the gel electrolyte in accordance with the present invention, a gel electrolyte is a mixture of a gelator and a liquid-electrolytic solvent and the mixture is stirred and heated as required to dissolve its components into each other and cooled to room temperature to form the gel electrolyte.

The liquid-electrolytic solvent is commonly found in a liquid electrolyte and may be polar or non-polar. The liquid-electrolytic solvent contains cations, preferably lithium ions and is a combination being selected from a group consisting of lithium iodide (LiI), iodine ($I_2$), an ionic liquid, 4-tert-butylpyridine (TBP) and 3-methoxypropionitrile (3-MPN). The ionic liquid may be an ionic liquid containing iodine salts and preferably is 1,2-dimethyl-3-propylimidazolium iodide.

Figure 1:
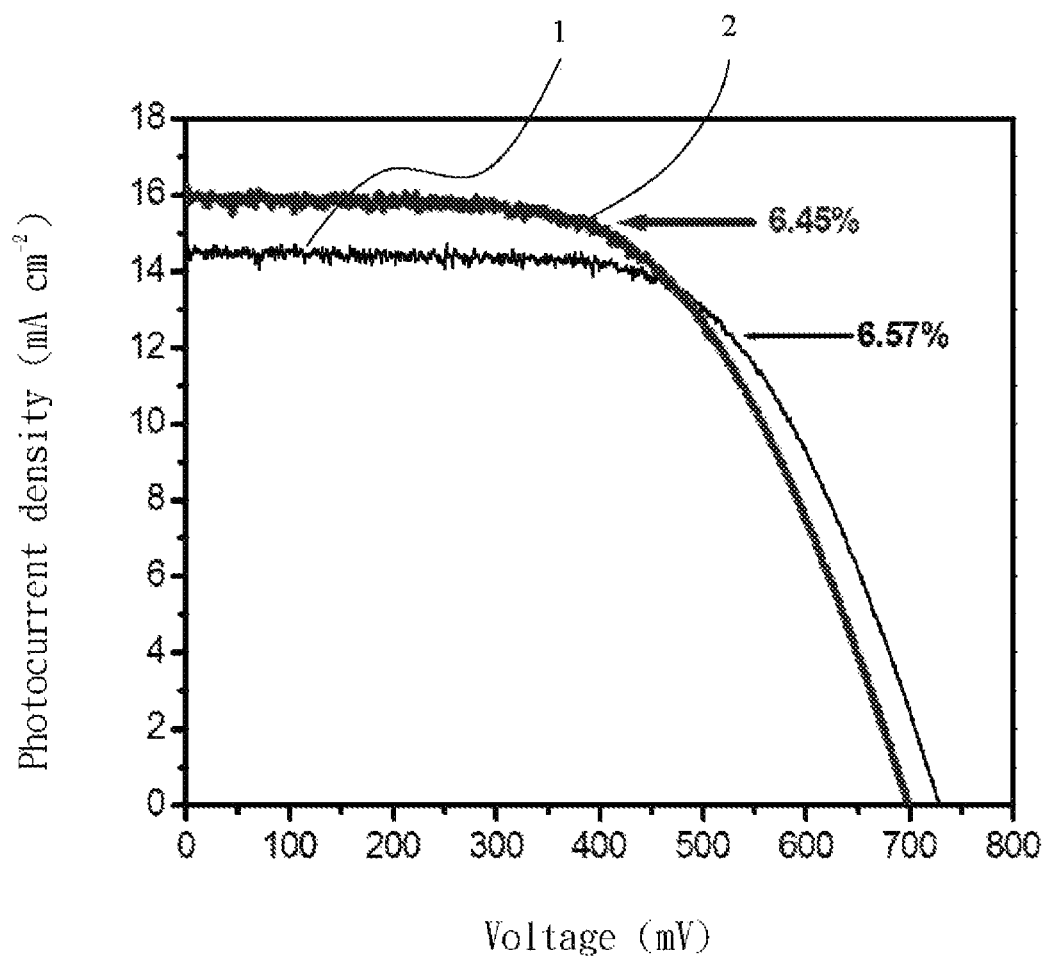
FIG. 1 is a graph of photocurrent density-voltage curves of dye-sensitized solar cells respectively with liquid electrolyte and gel electrolyte in Example 1.
Figure 2:
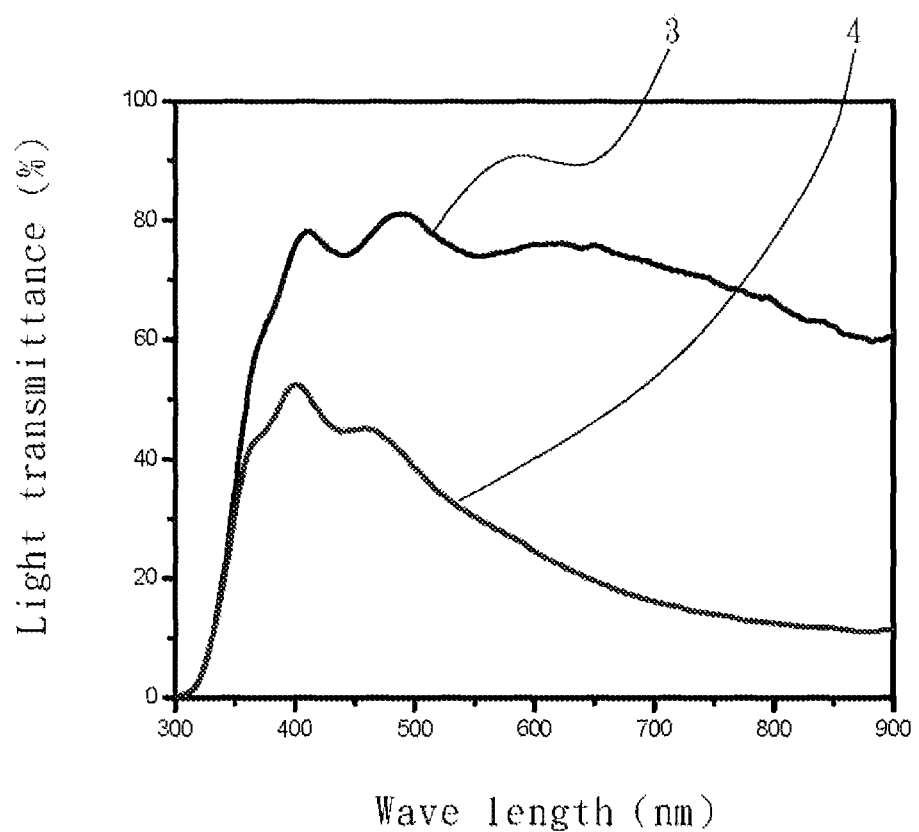
FIG. 2 is a graph of light transmittance of electrochromic devices with gel electrolyte in Example 2.
Figure 3:
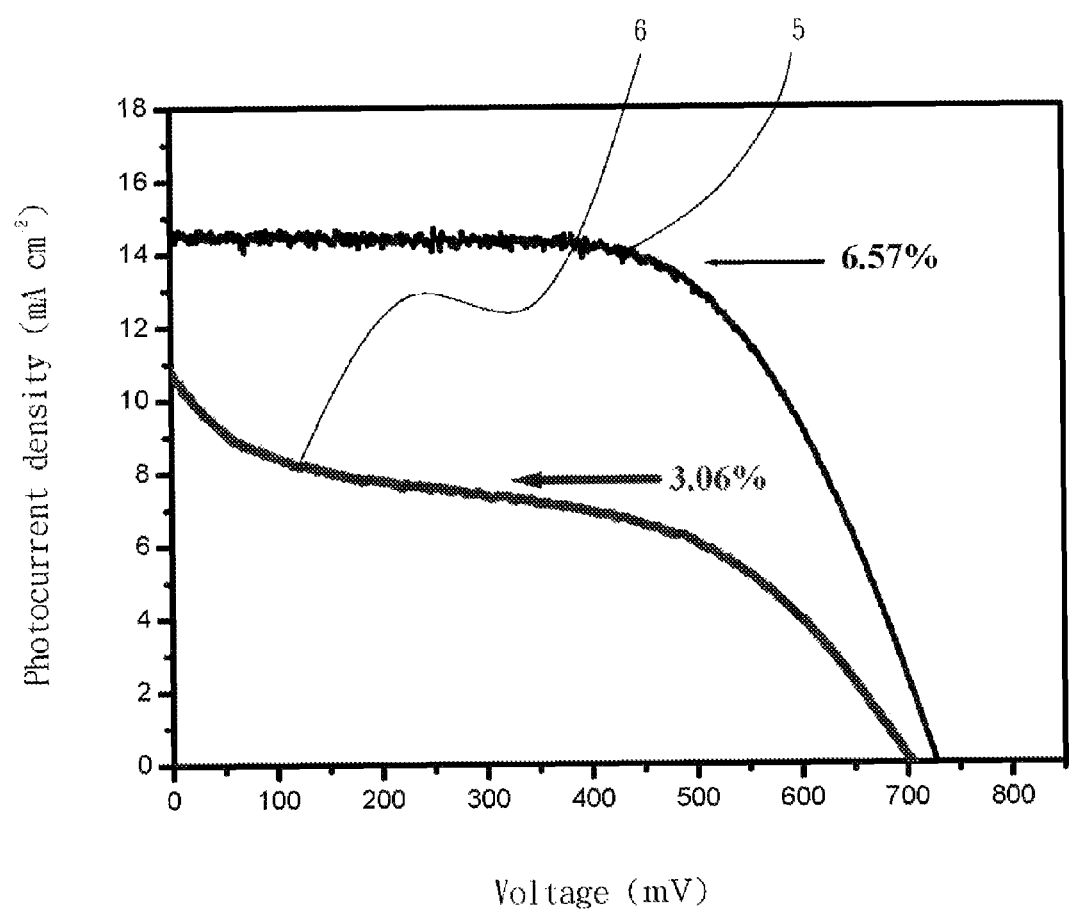
FIG. 3 is a graph of photocurrent density-voltage curves of dye-sensitized solar cells respectively with liquid electrolyte and gel electrolyte in Example 3.

With reference to FIGS. 1 to 3, three following examples show the use of the gelator of the present invention to produce a gel electrolyte respectively in dye-sensitized solar cells (DSSC), elctrochromic devices (ECD) and electrochemical cells.

EXAMPLE 1

A gelator for producing a gel electrolyte in dye-sensitized solar cells was poly-(acrylonitrile-co-vinyl acetate) (poly (AN-co-VA)) copolymer with molecular weight 250 KDa and comprises 92 wt % AN and 8 wt % VA. The gelator was adjusted to 7 wt % with a liquid-electrolytic solvent 3-MPN that contained iodide ions as redox couples at 25° C. to form a mixture. The mixture was stirred and heated at 130 to 140° C. for 5 to 10 minutes as required to dissolve its components into each other, and cooled to room temperature to form a gel electrolyte.

Multiple AN monomeric units link each other to polyacrylonitrile (PAN). PAN has strongly negative atoms (e.g. carbon and nitrogen) so that PAN can be coordinated to lithium ions in the liquid-electrolytic solvent, form ion-polymer complexes and dissolve in the liquid-electrolytic solvent.

Multiple VA monomeric units link each other to form polyvinyl acetate (PVA). PVA has a lower glass transition temperature (Tg) than PAN so that PVA can gel the liquid-electrolytic solvent.

With reference to FIG. 1, comparing to a dye-sensitized solar cell with a liquid electrolyte containing 3-MPN as solvent, a dye-sensitized solar cell with the gel electrolyte achieves 98% efficiency to convert light to electricity. Photocurrent density-voltage curves of the liquid electrolyte (1) and the gel electrolyte (2) are shown in FIG. 1.

TABLE 1

| | Light to electricity conversion efficiency (%) | Isc (mA cm$^{-2}$) | F.F. | Voc (mV) |
|---|---|---|---|---|
| Liquid electrolyte | 6.57 | 14.31 | 0.63 | 735.3 |
| Gel electrolyte | 6.45 | 15.86 | 0.62 | 717.2 |

With reference to table 1, short-circuit current (Isc), open circuit voltage (Voc), and fill factor (F.F.) of the cell with the gel electrolyte are almost identical to those with the liquid electrolyte. Additionally, ionic conductivity of the gel electrolyte ($3.69 \times 10^{-3}$ S cm$^{-1}$) is almost identical to ionic conductivity of the liquid electrolyte ($3.97 \times 10^{-3}$ S cm$^{-1}$). It is demonstrated that light-electrical properties of the cell with the gel electrolyte are similar to light-electrical properties of the cell with the liquid electrolyte and furthermore the gel electrolyte does not evaporate.

EXAMPLE 2

A gelator for producing a gel electrolyte in electrochromic devices was (poly(AN-co-VA)) of molecular weight 250 KDa and comprises 88 wt % of AN and 12 wt % of VA. The gelator was adjusted to 10 wt % with a lithium perchlorate electrolytic solvent (LiClO$_4$) at 25° C. to from a mixture. The mixture was stirred and heated at 80 to 100° C. for 5 to 10 minutes as required to dissolve its components into each other and cooled to room temperature to form a gel electrolyte.

With reference to FIG. 2, the gel electrolyte has different color in electrochromic devices. Light transmittance of electrochromic devices in bleach state (3) and in colored state (4) are shown in FIG. 2.

EXAMPLE 3

A gelator for producing a gel electrolyte in dye-sensitized solar cells was poly-(acrylonitrile-co-allyl acetate) (poly (AN-co-AA)) copolymer with molecular weight of 250 KDa and comprises 70 wt % of AN and 30 wt % of allyl acetate (AA). The gelator was adjusted to 20 wt % with a 3-MPN electrolytic solvent that contained iodide ions as redox couples at 25° C. to form a mixture. The mixture was stirred and heated at 130 to 140□ for 5 to 10 minutes as required to dissolve its components into each other, and cooled to room temperature to form a gel electrolyte.

With reference to FIG. 3, efficiency of light to electricity conversion of the cell with the gel electrolyte is about 50% that with a liquid electrolyte containing 3-MPN as solvent. Photocurrent density-voltage curves of the liquid electrolyte (5) and the gel electrolyte (6) are shown in FIG. 3.

TABLE 2

| | Light to electricity conversion efficiency (%) | Isc (mA cm$^{-2}$) | F.F. | Voc (mV) |
|---|---|---|---|---|
| Gel electrolyte | 3.06 | 10.6 | 0.41 | 706.1 |

Light-electrical properties of the cell with the gel electrolyte are shown in Table 2.

While preferred embodiments of the invention provide a gelator and an associated gel electrolyte to overcome inherent deficiencies of liquid and solid electrolytes, personnel knowledgeable in the art will recognize and understand that various modifications may be made to the embodiments and the appended claims are intended to cover all such modifications that may fall within the spirit and scope of the invention.

What is claimed is:

1. A gel electrolyte, comprising:
   a copolymer having an acrylonitrile monomeric unit; and
   a liquid electrolyte comprised of a 1,2-dimethyl-3-propylimidazolium iodide and a 3-methoxypropionitrile.

2. The gel electrolyte as claimed in claim 1, wherein the acrylonitrile monomeric unit is a major monomeric unit of the copolymer and is copolymerized with a first monomeric unit as a minor monomeric unit.

3. The gel electrolyte as claimed in claim 2, wherein the first monomeric unit is selected from the group consisting of a vinyl acetate, an allyl acetate, a styrene, an acrylamide and a combination thereof.

4. The gel electrolyte as claimed in claim 2, wherein the minor monomeric unit is one selected from a group consisting of an ethylene glycol, a propylene glycol, a tetramethylene glycol, a hexafluoropropylene, a trichloroethylene, a methylmethacrylate, a vinylpyrrolidone, an ethylene, an ethylene oxide, a propylene, a cellulose acetate, a cellulose acetate butyrate, a cellulose acetate propionate, a cyanoethylpullulan, a cyanoethyl cellulose, a cyanoethylsucrose, a carboxymethyl cellulose and a combination thereof.

5. The gel electrolyte as claimed in claim 1, wherein the liquid electrolyte is gelatinized by the copolymer.

6. A method for dissolving a copolymer, comprising steps of:
   providing the copolymer copolymerized by an acrylonitrile monomeric unit and a minor monomeric unit; and
   dissolving the copolymer with a solvent having a 1,2-dimethyl-3-propylimidazolium iodide and a 3-methoxypropionitrile.

7. The method as claimed in claim 6, wherein the solvent further comprises a lithium iodide, an iodine and a 4-tert-butylpyridine, and is a liquid electrolyte.

8. The method as claimed in claim 7, wherein the liquid electrolyte is gelatinized by the copolymer.

9. The method as claimed in claim 6, wherein the first monomeric unit and the acrylonitrile monomeric unit are a minor monomeric unit and a major monomeric unit, respectively.

10. The method as claimed in claim 6, wherein the first monomeric unit is selected from the group consisting of a vinyl acetate, an allyl acetate, a styrene, an acrylamide and a combination thereof.

* * * * *